United States Patent [19]

Pank et al.

[11] 4,073,326
[45] Feb. 14, 1978

[54] VENEER-PEELING MACHINES

[75] Inventors: John C. Pank, Pretoria; Ronald L. E. Clegg, Durban North, both of South Africa

[73] Assignee: Lion Match Company Limited, England

[21] Appl. No.: 715,400

[22] Filed: Aug. 18, 1976

[30] Foreign Application Priority Data

Sept. 5, 1975 United Kingdom ............... 36560/75

[51] Int. Cl.² .............................................. B27L 5/02
[52] U.S. Cl. .............................. 144/209 R; 144/213; 144/246 R; 144/325
[58] Field of Search ............... 144/209 R, 209 A, 211, 144/212, 213, 323, 325, 242 B, 246 R, 246 F, 247; 82/45, 38, 39, 91, 101

[56] References Cited

U.S. PATENT DOCUMENTS

| 2,884,966 | 5/1959 | Zilm | 144/209 R |
| 3,372,721 | 3/1968 | James et al. | 144/209 R |
| 3,421,560 | 1/1969 | Springate | 144/209 R |
| 3,455,354 | 7/1969 | Calvert | 144/209 R |
| 3,584,666 | 6/1971 | Jensen | 144/213 |

Primary Examiner—Harrison L. Hinson
Assistant Examiner—W. D. Bray
Attorney, Agent, or Firm—Leydig, Voit, Osann, Mayer & Holt, Ltd.

[57] ABSTRACT

A veneer peeling machine has a frame in which three rollers are mounted for rotation thereby to rotate a log between them. Two of the rollers are movable towards the third roller as the diameter of the log is reduced by peeling. A knife is movable to engage the log and peel a veneer from it, and the third roller, or preferably a fourth roller mounted close to the third roller in a fluid bearing extending along the length of the fourth roller, engages the log closely ahead of the knife edge to function as a nose bar.

10 Claims, 14 Drawing Figures

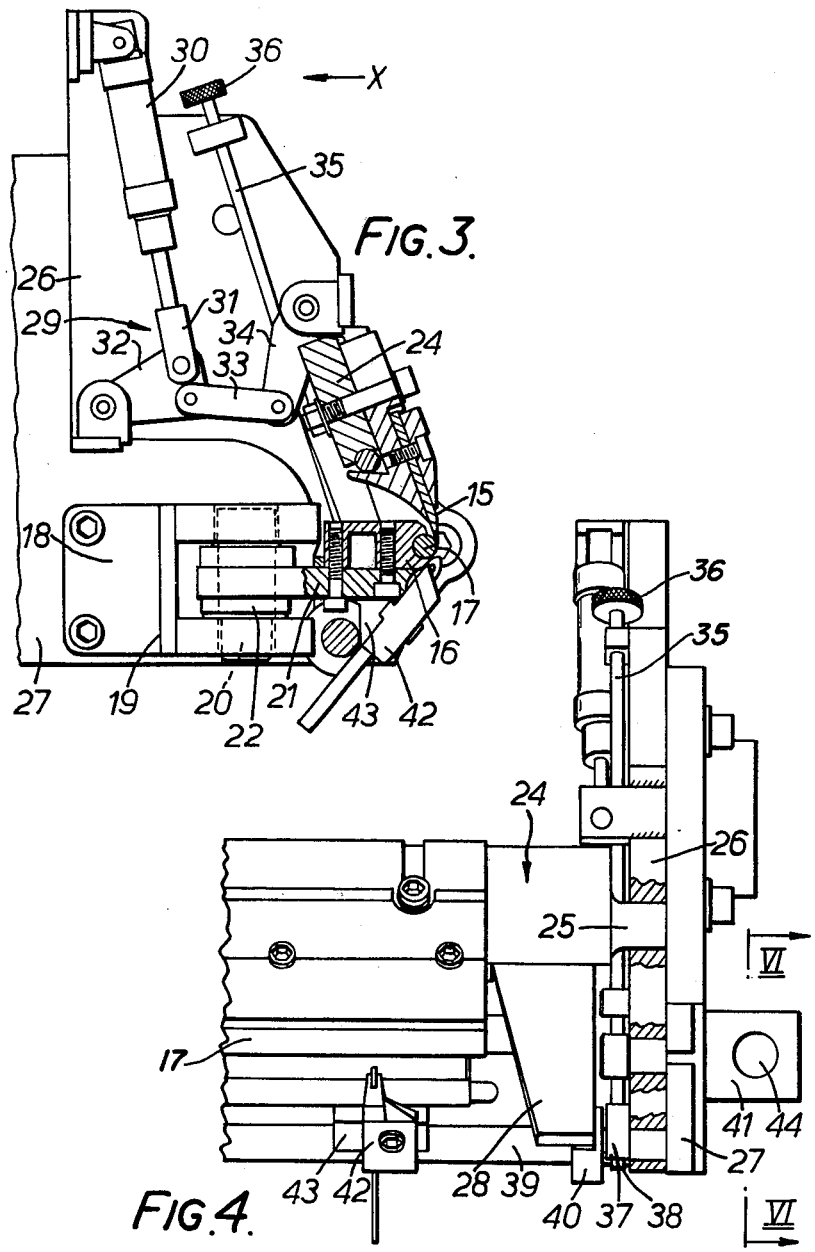

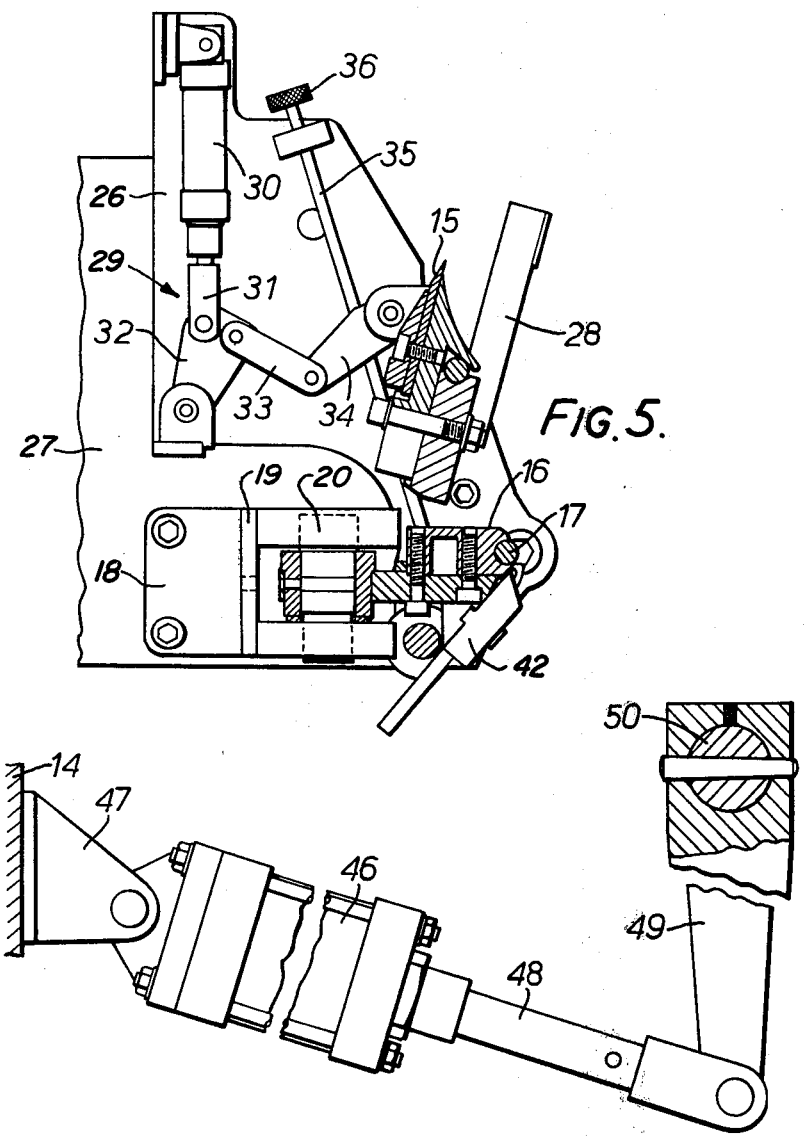

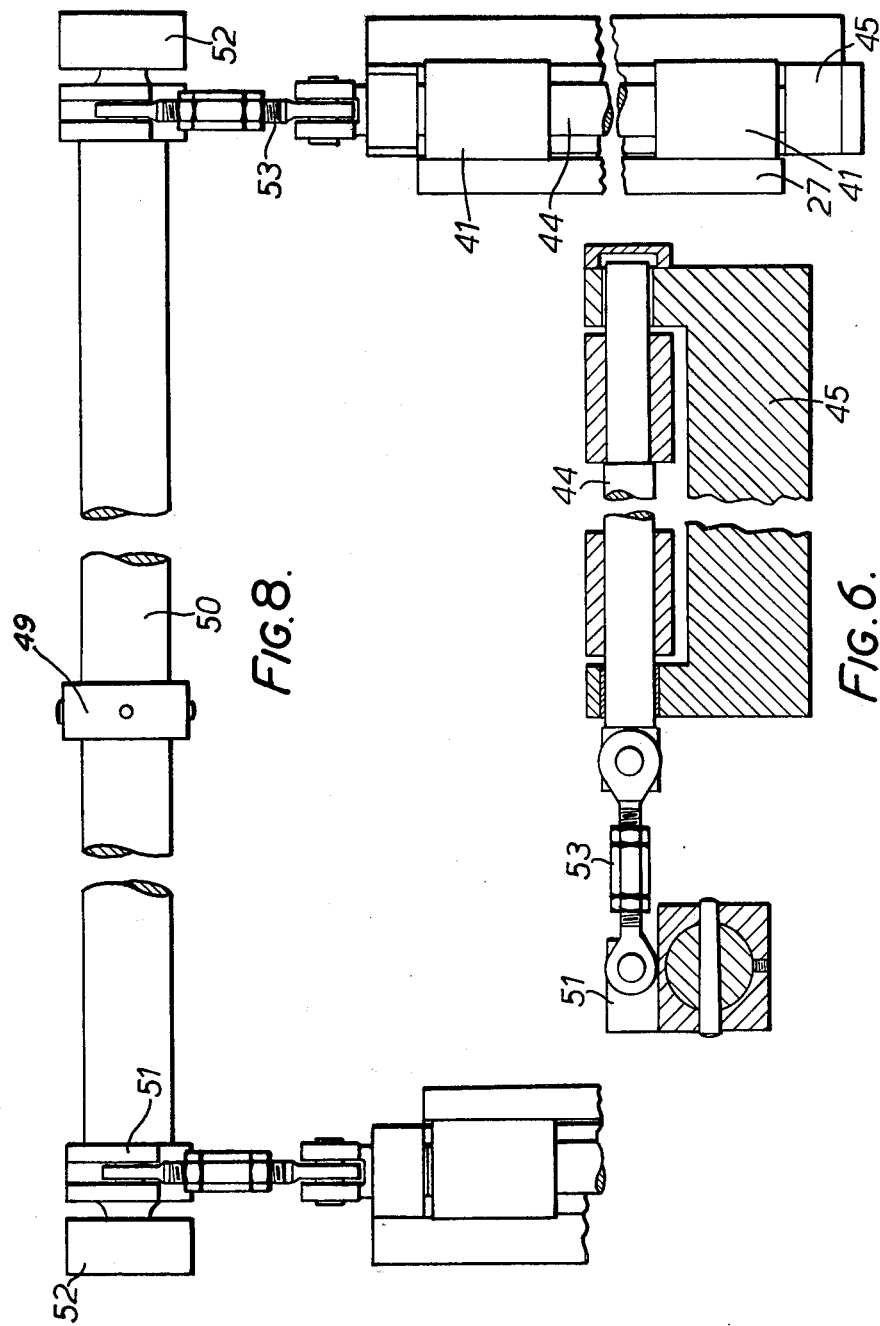

VENEER-PEELING MACHINES

This invention relates to veneer-peeling machines, and in particular to machines for peeling veneers from timber billets, hereinafter referred to as logs, for use in the manufacture of match sticks or other products, for example in the manufacture of plywood or furniture.

According to the invention, there is provided a veneer peeling machine comprising three rollers mounted in a frame on mutually parallel axes, first and second of the rollers being so mounted and so movable relative to each other and to the third rollers as to grip and rotate a log disposed between the three rollers, and a knife supported relative to a said log to peel a veneer therefrom as the log is rotated by the rollers.

The present invention also provides a veneer peeling machine comprising three rollers mounted for rotation in a frame with their axes disposed parallel to one another and spaced apart to receive a log therebetween, means for rotating first and second of the rollers in the same sense thereby to rotate a log between the rollers, means for urging the first and second rollers toward the third roller to press the log against the third roller, and a knife supported for movement in a plane parallel to the axes of the rollers to engage and peel a veneer from a said log.

The present invention further provides a veneer peeling machine comprising three rollers mounted for rotation in a frame with their axes disposed parallel to one another, the rollers being so movable relative to each other as to grip and rotate a log disposed between the three rollers, means for urging first and second of the rollers toward the third roller to press the log against the third roller, and a nose bar and a knife movable into a position adjacent the third roller to enable the knife to engage and peel a veneer from a said log.

One embodiment of a veneer peeling machine according to the invention will now be described, by way of example, with reference to the accompanying drawings in which:-

FIG. 3 is a sectional view of part of the machine showing means for supporting a knife for peeling a log;

FIG. 4 is an elevation of the features of FIG. 3 as seen in the direction of arrow X in FIG. 3 only one end of the construction being shown since the other end is symmetrical;

FIG. 5 is a view corresponding to that of FIG. 3 but showing the knife in a retracted position;

FIG. 6 is a section on the line VI—VI of FIG. 4;

FIGS. 7 and 8 are respectively a side elevation and a plan view of a system for applying pressure to the knife;

Figure 1:
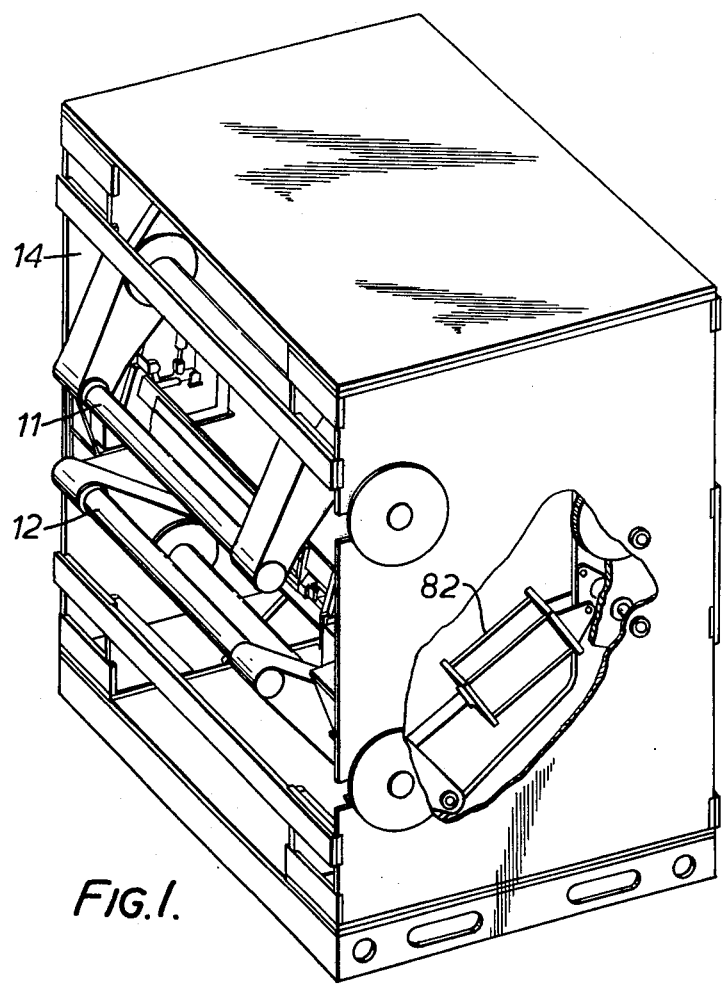
FIG. 1 is a perspective view of the machine.

As shown in the drawing, the machine comprises two driven pressure rollers 11, 12 mounted on horizontal and mutually parallel axes in a supporting frame 14 and equidistantly disposed above and below a horizontal plane P (FIG. 2) containing the axis of the log L to be peeled. A reaction roller 13 is supported on an axis parallel to those of rollers 11 and 12 below the plane P and this roller 13 comes into close proximity to the pressure roller 12 towards the end of the peeling operation. The three rollers thus form a system for supporting and gripping a log L therebetween and for rotating the log by rotation of the pressure rollers 11, 12.

Figure 2A:
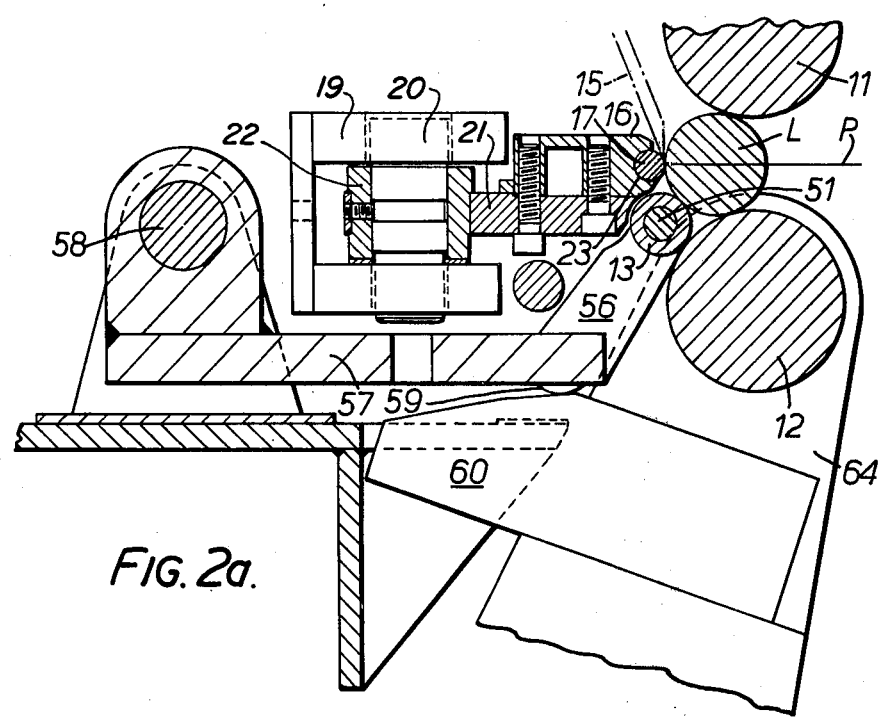
FIG. 2a is a view corresponding to that of FIG. 2 showing the changed position of the parts resulting from a reduction in the diameter of the log as the log is peeled.
Figure 2:
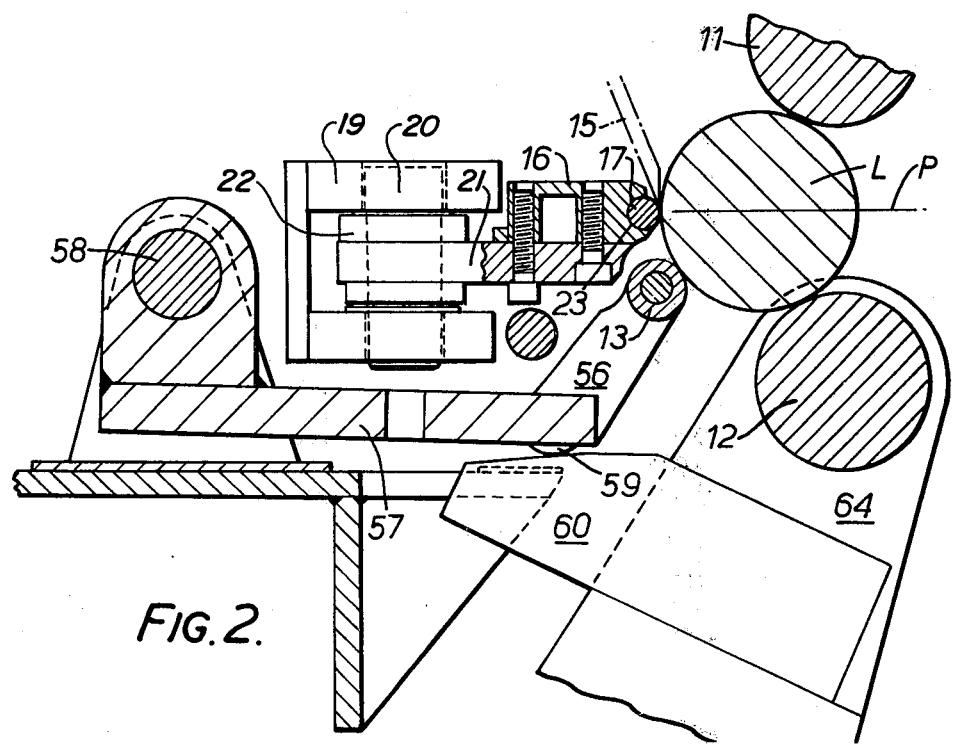
FIG. 2 is a sectional view of part of the machine showing rollers for supporting a log.

A knife 15 shown in ghost line in FIG. 2 is supported for engagement with the log L to peel the log as it is rotated, and a nose bar 16, whose nose can be formed by a roller 17, is located closely adjacent the knife to contact the log along the line of intersection of the plane P with the periphery of the log. As a alternative to the use of roller 17, a solid nose bar can be employed.

In operation of the machine, a log gripped between the driven pressure rollers 11, 12 and the reaction roller 13 is rotated by the rollers 11, 12. The knife 15, brought into engagement with the periphery of the log, peels a veneer from the log. As the diameter of the log is reduced, the pressure rollers 11, 12 swing towards the plane P, the reaction roller 13 is raised towards the plane P, and the nose bar 16 will move if necessary to maintain a constant pressure on the log. The constructional features of the machine which enable these functions to be performed will now be described.

A knife and nose bar assembly is formed by two vertical and horizontally-spaced plates 18 (only one of which is visible in FIG. 3) interconnected by a horizontal U section yoke 19 having a vertical pivot pin 20 at its centre (see FIGS. 2 and 3). A nose bar carrier 21 extends radially from a sleeve 22 surrounding the pivot pin 20, and the nose bar 16 is supported on the outer end of the carrier 21 for slight pivotal movement within the plane P. This pivotal movement permits the nose bar 16 to engage a slightly tapered log along its length, and maintains this engagement until the knife 15, which is held parallel to the axis of the log, has removed the taper by peeling.

The roller 17 of the nose bar 16 is supported within a hydrostatic bearing 23 (FIG. 2) extending along substantially the whole length of the nose bar, for rotation in contact with the periphery of the log.

The knife assembly comprises the knife 15 which is mounted on a knife carrier 24 (FIGS. 3 and 4), the carrier at each end having a pivot pin 25 (FIG. 4) which engages in a mounting plate 26, each mounting plate 26, together with the adjacent plate 18 being supported on one of a pair of opposite side plates 27 of the knife and nose bar assembly. By supporting the knife carrier 24 on such pivot pins 25, the knife carrier can be rotated by an arm 28 (FIG. 5) secured thereto to swing the knife out of engagement with the log L into the position shown in FIG. 5 for honing purposes and knife replacement. After the knife has been swung back into the operative position of FIG. 3 which is located by contact between arm 28 and an eccentric roller 40 (FIG. 4) referred to below, it is locked in place by a toggle-action locking mechanism 29 (FIGS. 3 and 5) formed by a pneumatic actuator 30 and links 31-34, of which link 34, in the locked position of FIG. 3, engages a surface (not shown) on the knife carrier 24.

In order to vary the thickness of the veneer, a screw adjuster rod 35 is provided having at one end a knob 36 and at its opposite end a worm 37 which engages a worm wheel 38 (FIG. 4). The wheel 38 is secured to a shaft 39 extending transversely of the knife assembly and journalled at its ends in the mounting plates 26. The eccentric roller 40 referred to above is secured to the end of the shaft 39 as shown for rotation thereby. Accordingly rotation of the adjuster rod 35 by knob 36 rotates the worm 37, worm wheel 38, shaft 39 and eccentric roller 40 thereby displacing the arm 28 and pivoting the knife carrier on its pivot pins 25. The amount of movement of the carrier will of course be extremely small. For the sake of accuracy, a second eccentric roller and cooperating arm (not shown) corresponding to roller 40 and arm 28 are provided at the opposite end of the knife assembly.

A lancet 42 is mounted on each side of the knife carrier assembly to cut the peeled veneer to the desired width, the lancet being keyed in a guide 43 secured to the nose bar carrier 21 to permit lateral adjustment of its position.

The knife and nose bar assembly are supported and guided for movement towards and away from the pressure rollers by a guide bar 44 (FIGS 4, 6 and 8) at each side of the assembly which is secured to mountings 41 (FIG. 8) on the side plate 27 of the knife and nose bar assembly and slides in a guide block 45 (shown also in FIG. 6). The knife and nose bar assembly is urged towards the log by a controllable-pressure actuator shown in FIG. 7.

The pressure actuator for the knife and nose bar assembly comprises a pneumatic cylinder 46 pivoted to a support 47 on the machine frame 14, the cylinder having a piston rod 48 connected at its outer end to the outer end of a radial arm 49 pinned to the centre of a shaft 50. The shaft 50 (see FIG. 8) extends transversely of the machine and is journalled in bearings 52 on the side of the frame 14. A short radial arm 51 is pinned to each end of the shaft and is connected via an adjustable linkage 53 to one end of the adjacent guide bar 44, which slides in guide block 45.

Returning to FIG. 2, the reaction roller 13 is rotatably mounted at its opposite ends, and if necessary at intermediate points along its length, on support arms 56 forming part of a reaction roller carrier 57. This carrier is supported at its rearward end, remote from the roller 13, on a fixed horizontal pivot shaft 58. A cam-following roller 59 journalled in the forward end of each side of the carrier is engageable with a cam plate 60. This plate 60 is movable as a result of translational movement of the pressure roller 12. The reaction roller 13, which is supported on a hydrostatic bearing 51, is driven by contact with the log.

Figure 9:
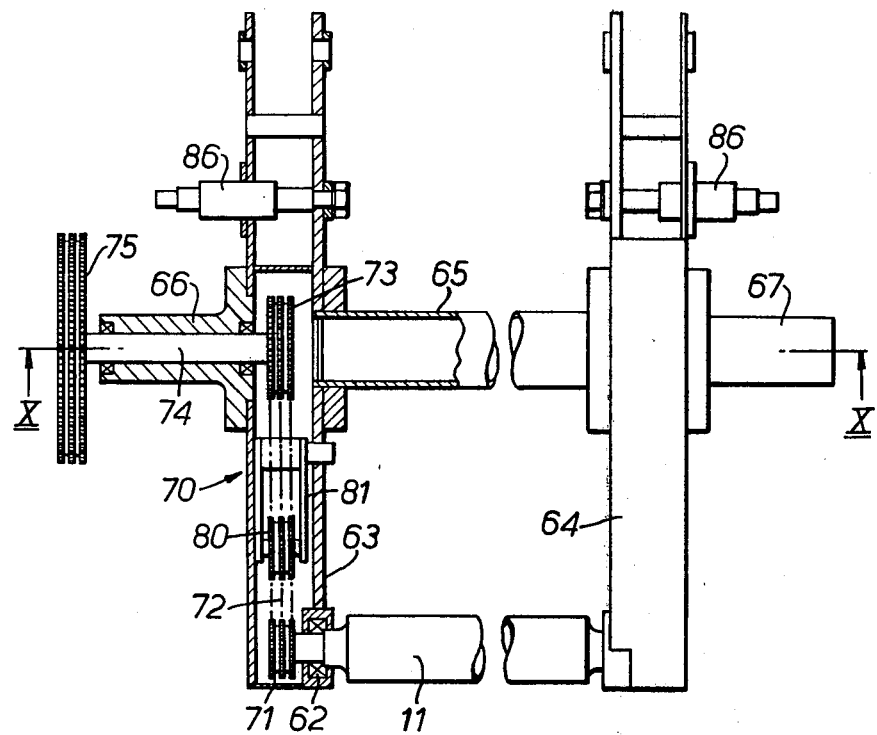
FIG. 9 is a plan view, part sectioned, of one of the pressure rollers of the machine with its supporting arms and drive mechanism.
Figure 10:
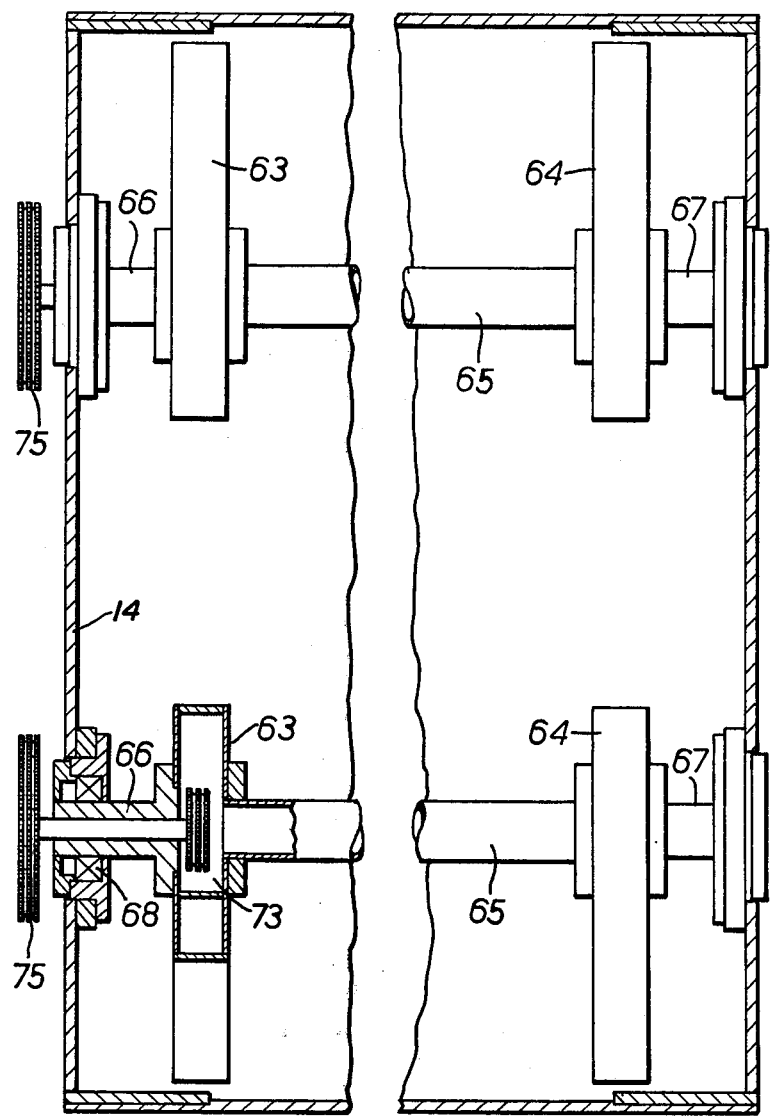
FIG. 10 is a section on the line X—X of FIG. 9 showing the pivot arrangement for the supporting arms of both pressure rollers.
Figure 11:
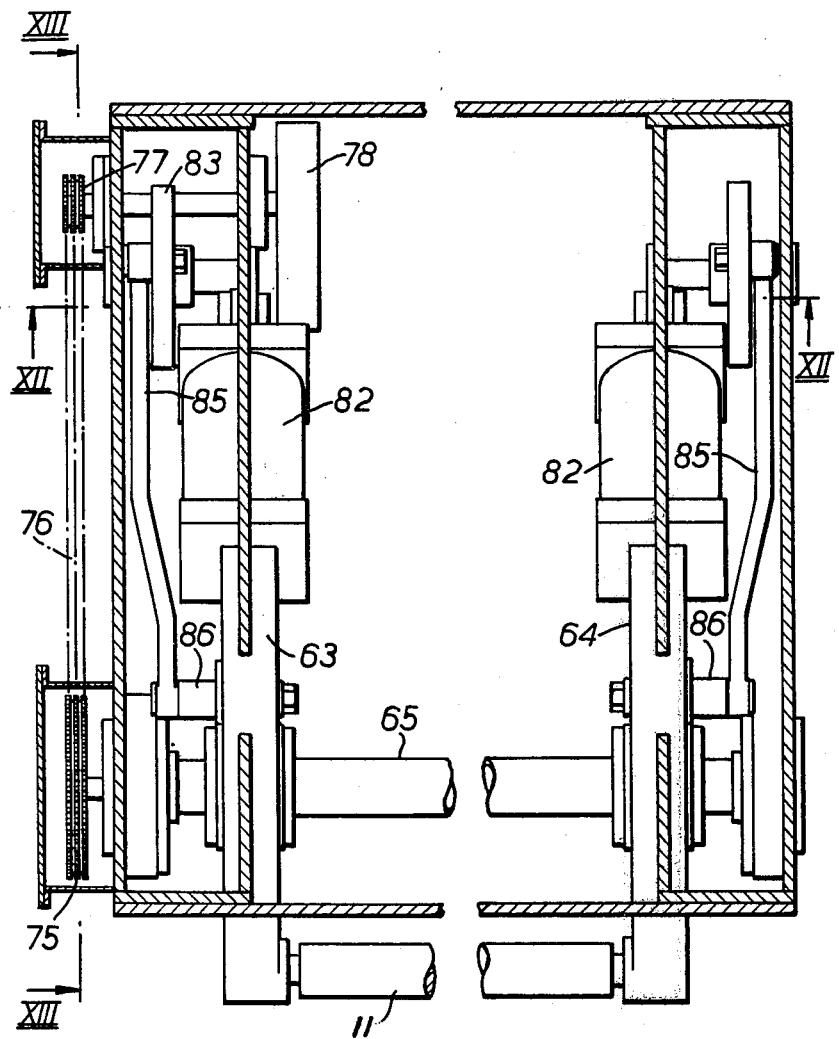
FIG. 11 is a sectional view of the drive coupling for transmitting drive to one of the pressure rollers.
Figure 12:
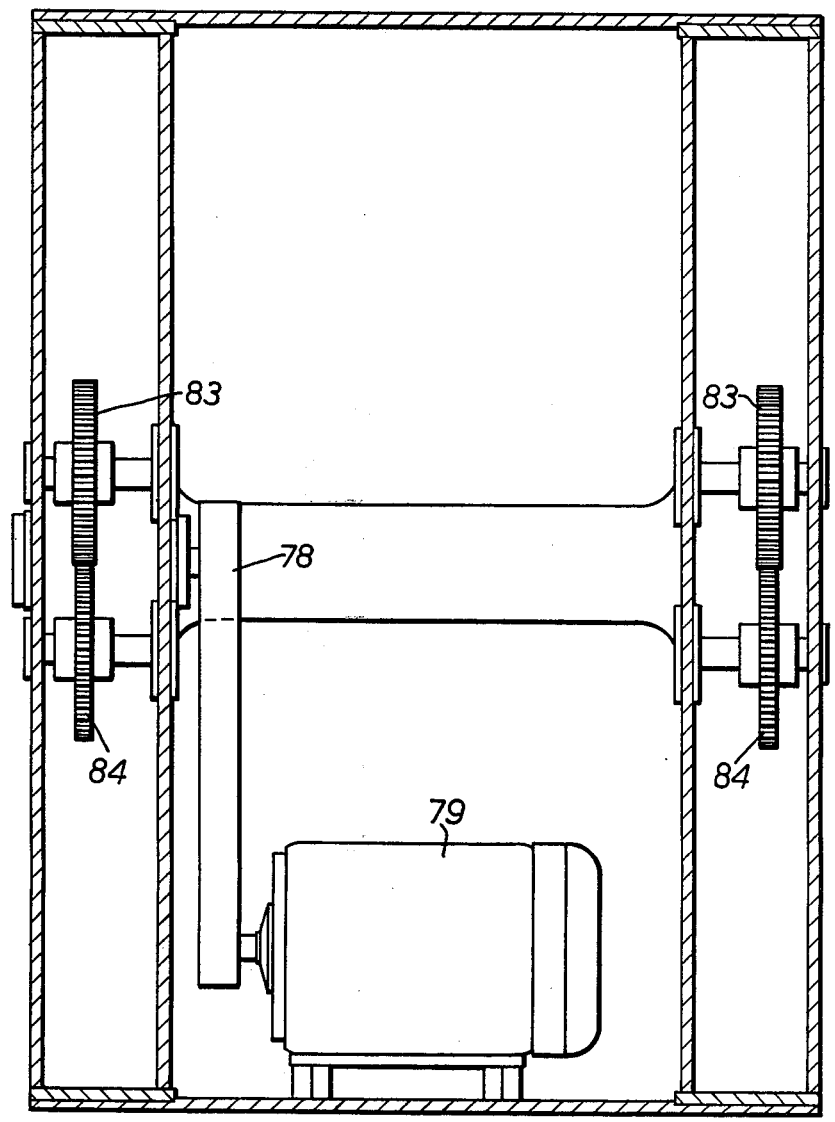
FIG. 12 is a section on the line XII—XII of FIG. 11.
Figure 13:
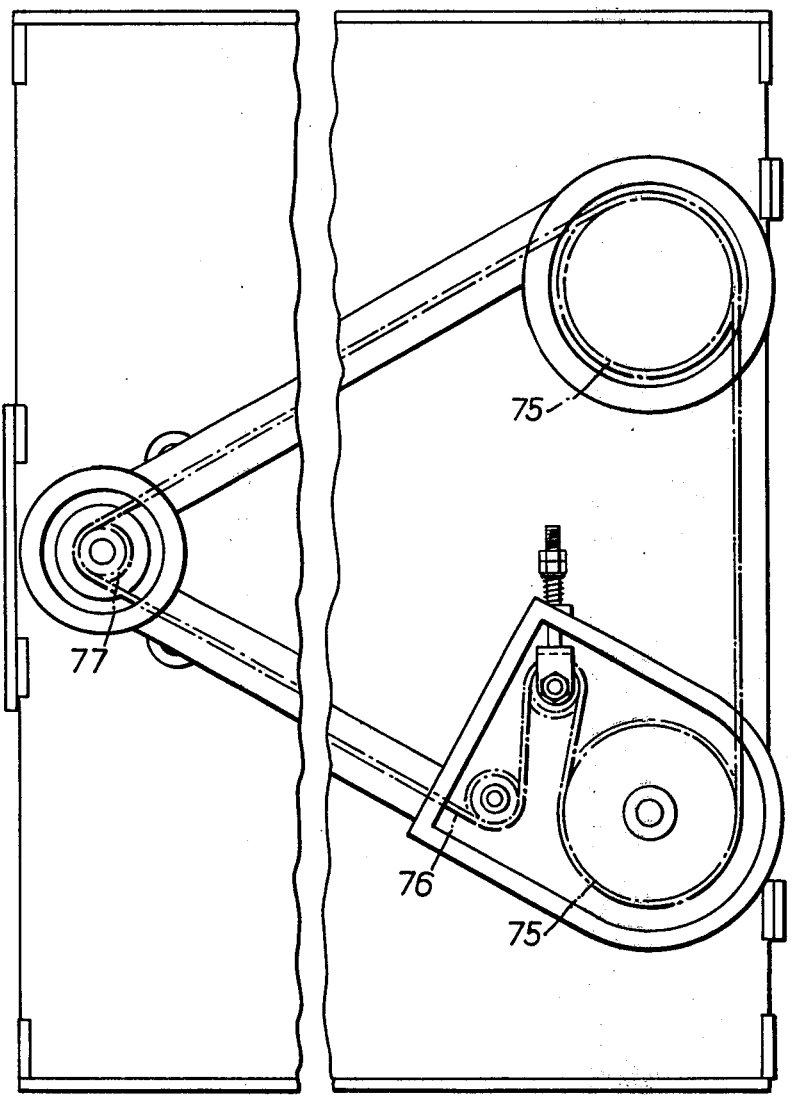
FIG. 13 is a section on the line XIII—XIII of FIG. 11.

The means for supporting and driving each of the pressure rollers 11, 12 are identical and, as shown in FIG. 9, pressure roller 11 is mounted in bearings 62 at its opposite ends in a pair of parallel-spaced hollow support arms 63, 64. The support arms are interconnected by a tubular shaft 65, at approximately mid-way along each support arm, coaxial with stub shafts 66, 67 journalled in bearings 68 (FIG. 10), in the sides of the frame 14. One support arm of each pair contains a drive transmission 70 (FIG. 9) in the form of a first sprocket wheel 71 on one end of the pressure roller which is driven by a chain 72 from a second sprocket wheel 73 on the axis of the pivot shaft formed by shafts 65, 66 and 67. A drive shaft 74, which supports the second sprocket wheel has a third sprocket wheel 75 on its opposite outer end, the third sprocket wheel being driven by a chain 76 (FIGS. 11 and 13) from a fourth sprocket wheel 77 which is common to the drive transmission of both pressure rollers. This fourth sprocket wheel 77 is driven by a belt transmission 78 from a drive motor 79 (FIG. 12).

An idler sprocket wheel 80 (FIG. 9) on an adjustable support arm 81 is provided between sprocket wheels 71 and 73 to tension the chain 72.

The swinging movement of each pressure roller about its pivot shaft 65, 66, 67 is effected by pneumatic actuators 82 (FIGS. 1 and 11) which are mounted on the frame 14 and act on the ends of the support arms 63, 64 remote from the pressure roller. To ensure that each pressure roller moves by an equal amount at each end, two pairs of intermeshing gears 83, 84 (see FIGS. 11 and 12) are mounted on opposite sides of the frame symmetrically with respect to the two pressure rollers, and each roller of each pair is connected by a separate drive rod 85 and pin 86 to respective support arms of the two pressure rollers, so that any movement of one end of one pressure roller causes an equal and opposite movement of the corresponding end of the other pressure roller.

Movement of the reaction roller 13 is effected by the cam plates 60 mounted on the support arms 63, 64 (FIGS. 2 and 11) of the pressure roller 12 so that inward swinging movement of the pressure roller causes a lifting of the reaction roller 13 to compensate for the reduction of the log diameter.

Considering the operation of the machine in greater detail, operation of the pressure roller actuators 82 (FIGS. 1 and 11) in a reverse sense to swing the pressure rollers 11, 12 away from the reaction roller 13 will open up a space between pressure roller 12 and reaction roller 13 through which the remainder of the last peeled log can fall, and the spacing between the pressure rollers 11, 12 will allow a new log to be inserted, and gripped between rollers 11, 12 and 13 upon reverse operation of the actuators. When the new log is engaged by the knife 15, and the pressure rollers 11, 12 are rotating, peeling will commence and the pressure applied to the log by the pressure rollers and movement of the reaction roller 13 by cam plates 60 will ensure that the log remains gripped by the rollers and that its axis will lie in the plane P. The desired pressure of the nose bar against the log will be controlled by the pressure actuator 46 of the knife and nose bar assembly and this will be quite independent of the pressure between the log L and the reaction roller 13.

In comparison with a conventional peeling machine in which the log is mounted at its opposite ends on pivot shafts and driven by rotation of these shafts, the present invention provides substantially greater rigidity in that the log is supported along its full length. Moreover, the log is driven peripherally and hence the softness of the centre of the log is of little concern. Veneer speed is inherently constant, being independent of log diameter.

More importantly however, as will be apparent from the foregoing description, peeling can continue until the log is of a diameter much smaller than is possible in a conventional peeling machine. Again rejection of the core of a peeled log and insertion of a new log, in a machine as described above, are extremely quick operations permitted merely by an outward movement, followed by an inward movement, of the pressure rollers. Location of the new log in relation to the knife and nose bar takes place automatically.

In a modification of the veneer-peeling machine described above, not illustrated, only three log-contacting rollers are used, the first and second rollers being substantially symmetrically disposed relative to the third roller which is of relatively small diameter in relation to the first and second rollers, and the knife being located adjacent the third roller which then serves as a nose bar. In this modification a back-up roller or a hydrostatic bearing can be used to support the third roller along its length, and the knife can be brought into and out of its operative position by movement in a direction lateral to the plane containing the axes of the third roller and of the log.

WE CLAIM IS:

1. A veneer peeling machine comprising a frame, three rollers, means mounting said rollers in said frame for rotation on mutually parallel axes, first and second of the rollers being so mounted and so movable relative to each other and to the third roller as to grip and rotate a log disposed between the three rollers, a knife and means supporting the knife relative to a said log to peel a veneer therefrom as the log is rotated by the rollers.

2. A veneer peeling machine comprising a frame, three rollers, means mounting the rollers for rotation in the frame with their axes disposed parallel to one another and spaced apart to receive a log therebetween, means for rotating first and second of the rollers in the same rotational direction thereby to rotate a log between the rollers, means for urging the first and second rollers toward the third roller to press the log against the third roller, a knife and means for moving the knife to engage and peel a veneer from a said log.

3. A veneer peeling machine comprising a frame, three rollers, means mounting the rollers for rotation in the frame with their axes disposed parallel to one another, said means enabling the rollers to move relative to each other so as to grip and rotate a log disposed between the three rollers, means for urging first and second of the rollers toward the third roller to press the log against the third roller, a nose bar and a knife having a cutting edge and means mounting said nose bar and knife for movement into a position adjacent the third roller to enable the knife to engage and peel a veneer from a said log.

4. A machine according to claim 3 wherein said means mounting said nose bar and knife enable the cutting edge of the knife and said nose bar to move in a plane parallel to the axes of the rollers, the plane containing lines equidistant from the axes of the first and second rollers.

5. A machine according to claim 4 wherein the nose bar includes a fourth roller which forms the nose of said nose bar.

6. A machine according to claim 5 including fluid bearing means wherein the fourth roller is mounted along substantially its whole length.

7. A machine according to claim 3 wherein the means for rotating the rollers comprise a motor connected to the first and second rollers through drive couplings.

8. A machine according to claim 3 wherein the diameter of the third roller is substantially less than the individual diameters of the first and second rollers.

9. A machine according to claim 3 wherein the third roller is movable toward the plane containing the cutting edge of the knife and the axis of the log in response to reduction of the diameter of the log and the consequent inward movement of the first and second rollers.

10. A machine according to claim 8 including fluid bearing means which extend over substantially the whole length of the third roller and wherein the third roller is supported.

* * * * *